United States Patent
Stewart (10) Patent No.: US 8,209,496 B2
(45) Date of Patent: Jun. 26, 2012

(54) METHOD AND SYSTEM FOR ACCESSING DATA

(75) Inventor: Simon David Stewart, Ross Creek (AU)

(73) Assignee: International Business Machines Corporation, Armonk, NY (US)

(*) Notice: Subject to any disclaimer, the term of this patent is extended or adjusted under 35 U.S.C. 154(b) by 689 days.

(21) Appl. No.: 12/340,837

(22) Filed: Dec. 22, 2008

(65) Prior Publication Data

US 2010/0161751 A1 Jun. 24, 2010

(51) Int. Cl.
G06F 12/00 (2006.01)
(52) U.S. Cl. ........................................ 711/148
(58) Field of Classification Search .............. None
See application file for complete search history.

(56) References Cited

U.S. PATENT DOCUMENTS

| | | | |
|---|---|---|---|
| 5,809,525 A * | 9/1998 | Bishop et al. | 711/122 |
| 5,835,714 A | 11/1998 | Herzl et al. | |
| 6,073,209 A * | 6/2000 | Bergsten | 711/114 |
| 6,282,610 B1 * | 8/2001 | Bergsten | 711/114 |
| 6,345,368 B1 * | 2/2002 | Bergsten | 714/11 |
| 7,203,801 B1 * | 4/2007 | Sharma et al. | 711/148 |
| 7,401,081 B2 | 7/2008 | Fuente et al. | |
| 2003/0204539 A1 * | 10/2003 | Bergsten | 707/204 |
| 2005/0071546 A1 * | 3/2005 | Delaney et al. | 711/112 |
| 2005/0091426 A1 * | 4/2005 | Horn et al. | 710/33 |
| 2010/0057949 A1 * | 3/2010 | Weber | 710/22 |

OTHER PUBLICATIONS

IBM TotalStorage SAN Volume Controller FAQ for Cisco MDS 9000 http://www.cisco.com/en/US/products/hw/ps4159/ps4358/products_qanda_item09186a00801cd100.shtml.

* cited by examiner

*Primary Examiner* — Hiep Nguyen
(74) *Attorney, Agent, or Firm* — George R. McGuire; Blaine T. Bettinger; Bond Schoeneck & King (57) ABSTRACT

A method and system for distributing and accessing data over multiple storage controllers wherein data is broken down into one or more fragments over the multiple storage controllers, each storage controller owning a fragment of the data, receiving a request for data in a first storage controller from one of a plurality of hosts, responding to the host by the first storage controller with the request if the first storage controller contains the requested data, forwarding the request to the second storage controller from the first storage controller if the first storage controller does not contain the requested data, responding to the first storage controller from the second storage controller with the request, and responding to the host from the first storage controller with the request.

20 Claims, 4 Drawing Sheets

METHOD AND SYSTEM FOR ACCESSING DATA

FIELD OF INVENTION

The present invention relates generally to methods and systems for accessing data and more particularly, to fragmenting storage space and assigning it to multiple controllers.

BACKGROUND

Enterprises commonly maintain multiple copies of important data and expend large amounts of time and money to protect this data against losses due to disasters or catastrophes. In some storage systems, data is stored across numerous disks that are grouped together. These groups can be linked with arrays to form clusters having a large number of individual disks.

In cluster storage systems, data availability can be disrupted while arrays or groups of disks are being managed. For instance, it may be desirable to transfer access to disk groups from one array to another array. During this transfer, however, applications accessing data within the disk group can fail or timeout and cause a disruption to application service and operation of the enterprise. Such disruptions can also occur when arrays are added or removed from a cluster.

Regardless of the backup or data transfer techniques being used, enterprises can lose valuable time and money when storage arrays are taken offline or shutdown. In these situations, applications are shutdown, storage devices are disconnected and reconnected, logical unit numbers (LUNs) are re-mapped, etc. While the storage arrays are offline, operation of the enterprise is disrupted and jeopardized.

A host server may continue to perform data access operations to a backup or secondary storage controller in the event of a failure of a primary storage controller. For example, in the IBM HyperSwap™ configuration, a host server may access a primary and a secondary storage controller. The host server may direct all storage accesses to the primary storage controller and the two storage controllers may operate in concert to ensure that identical data is saved in both. HyperSwap software on the host server may be able to determine when the primary storage controller has failed and can automatically redirect all storage accesses to the secondary storage controller.

While all systems continue to perform without shutdowns or disruptions, the request for data may still be delayed due to the distance it must travel. In a hyperswap setup, host machines located at secondary sites access the disk systems at the primary site. This produces delays to the I/O operations due to the distance between sites. During a hyperswap (assuming a complete failure of the primary site), time is required on the secondary site host to switch the unit control blocks (UCBs) to the secondary disk.

Excess loads on cross-town data links can cause delays. As the amount of disk being mirrored increases, more cross-town bandwidth is needed, which increases costs. There is a need to reduce the load on the existing infrastructure. Problems can arise from a shortage of unit control blocks (UCBs) in metro mirror applications and the implementation of Parallel Access Volume (PAV) can use up the available addressing in the system. Making UCBs available can be time consuming and/or difficult. There remains a need to provide a simplified infrastructure configuration with a reduction in backlogs.

SUMMARY

According to one embodiment of the present invention, a method for distributing and accessing data over multiple storage controllers is provided wherein data is broken down into one or more fragments over the multiple storage controllers, each storage controller owning a fragment of the data, receiving a request for data in a first storage controller from one of a plurality of hosts, responding to the host by the first storage controller with the request if the first storage controller contains the requested data, forwarding the request to the second storage controller from the first storage controller if the first storage controller does not contain the requested data, responding to the first storage controller from the second storage controller with the request, and responding to the host from the first storage controller with the request.

According to another aspect of the method, multiple controllers are disposed at varying distances from one of a plurality of hosts or equidistant from one of the plurality of hosts.

According to a further aspect of the method, the first storage controller is most proximate to one of a plurality of hosts.

According to yet another aspect of the method, the second storage controller is the owner of the requested data. The request may include a read or write request.

According to still a further aspect of the method, the first storage controller is the owner of the requested data.

According to another aspect of the method wherein the request is a write request, the first storage controller sends the write request to the second storage controller, wherein the second storage controller is the owning controller, the second storage controller sends a commit request to a third controller, wherein the third controller is the originating controller, and the first storage controller confirms the write request to the host.

According to another embodiment of the present invention, a system for distributing and accessing data over multiple controllers is provided, wherein data is broken down into one or more fragments over the multiple controllers, the system including a primary host, a first storage controller, and a second storage controller, wherein the primary host makes a request for data to the first storage controller, wherein the first storage controller responds to the primary host with the request if the first storage controller contains the requested data, wherein the first storage controller forwards the request to the second storage controller if the first storage controller does not contain the requested data, wherein the second storage controller responds to the first storage controller with the request, and wherein the first storage controller responds to the primary host with the request.

According to another aspect, the system further includes a storage area network and a secondary host, wherein the secondary host makes a request for data to the second storage controller, and wherein the second storage controller responds to the secondary host with the request without needing to switch connections.

According to a further aspect, the system further includes a plurality of storage controllers, wherein the first, second and plurality of storage controllers are disposed at varying distances from the primary host.

According to yet another aspect of the system, the first, second and plurality of storage controllers are disposed equidistant from the primary host.

According to one more aspect of the system, the first storage controller is most proximate to the primary host and the second storage controller is the owner of the requested data. The request includes a read or write request.

According to another embodiment of the present invention, a computer program product encoded in a computer readable medium for instructing a system to distribute and access data over multiple storage controllers is provided wherein data is broken down into one or more fragments over the multiple storage controllers and wherein each storage controller owns a fragment of the data, the program code configured to cause the computer to perform the method including receiving a request for data in a first storage controller from one of a plurality of hosts, responding to the host by the first storage controller with the request if the first storage controller contains the requested data, forwarding the request to the second storage controller from the first storage controller if the first storage controller does not contain the requested data, responding to the first storage controller from the second storage controller with the request, and responding to the host from the first storage controller with the request.

According to another aspect of the computer program product, the multiple storage controllers are disposed at varying distances from the one of a plurality of hosts or are disposed equidistant from one of the plurality of hosts.

According to a further aspect of the computer program product, the first storage controller is most proximate to the one of a plurality of hosts and the second storage controller is the owner of the requested data.

According to yet another aspect of the computer program product, the request includes a read or write request.

According to still a further aspect of the computer program product, the first storage controller is the owner of the requested data.

According to another aspect of the computer program product, the request is a write request, wherein the first storage controller sends the write request to the second storage controller, wherein the second storage controller is the owning controller, wherein the second storage controller sends a commit request to a third controller, wherein the third controller is the originating controller, and wherein the first storage controller confirms the write request to the host.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

For the purposes of this patent description and claims, the inventors intend that the following term be understood to have the following definition.

"Present invention" means at least some embodiments of the present invention; references to various feature(s) of the "present invention" throughout this document do not mean that all claimed embodiments or methods include the referenced feature(s).

Figure 1:
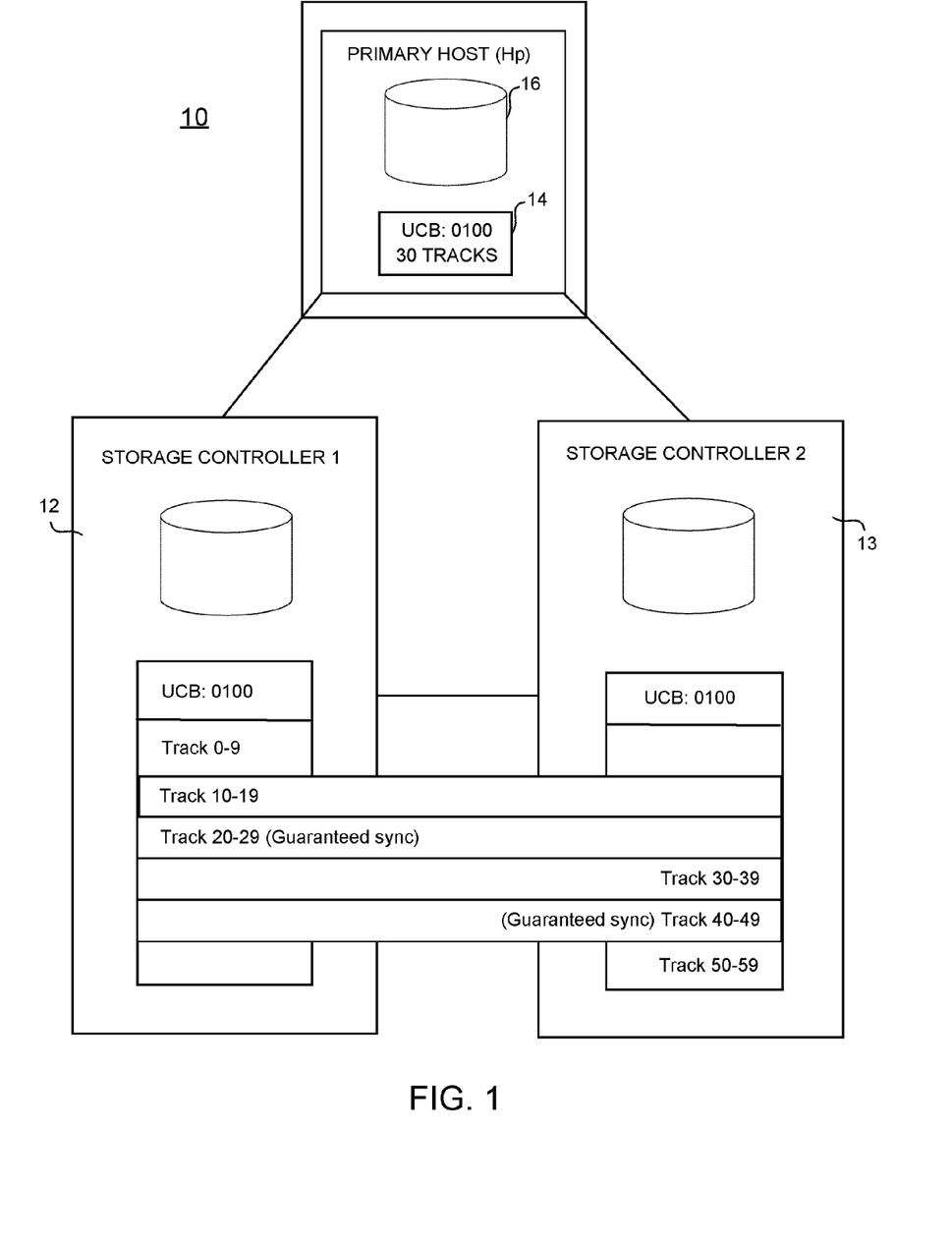
FIG. 1 shows a block diagram of an embodiment of a system for providing storage control in a network of storage controllers.

Embodiments of the invention provide a system and method for distributing and accessing data over multiple controllers. Reference is made to FIG. 1, which illustrates an embodiment of a system 10 for distributing data into fragments over a series of controllers 12 and 13. A fragment is a quantity of data that can be as little or as large as one prefers. It is preferable that it is not smaller than the minimum addressable data size (e.g., the tracks for mainframes and the blocks for open systems) and is not larger than the logical volume for storing and managing data. System 10 includes a primary host 14, which has access to storage controllers 12 and 13, although the system is not limited to the number of hosts that may access the fragmented data or the number of storage controllers that may contain the fragmented data. Examples of hosts include any suitable computational device such as, but not limited to, a personal computer, a workstation, a server, a mainframe, a hand held computer, a palm top computer, a telephony device, a blade computer, and a network appliance. Hosts 14 may include any suitable operating system (not shown), such as, the IBM OS/390™ operating system and the Microsoft™ Windows™ operating system and any host applications 16 that send Input/Output (I/O) requests to the storage controllers 12 and 13.

On each controller, 12 and 13, is a volume/logical disk that is found under the UCB address 0100, which has 60 tracks (0-59). Since these controllers 12 and 13 both have the same UCB, the data is the same. Within each controller 12, 13, is a graphical representation of the fragments, how they appear across multiple controllers and how the ownership may be set. Controllers 12 and 13 may be within a synchronous communication distance to each other. The synchronous distance between two storage controllers is the distance up to which synchronous communication is feasible between the storage controllers. As shown in FIG. 1, storage controller 12 contains tracks 0-49 and storage controller 13 contains tracks 10-59. Tracks 0-9 make up a fragment (Fragment 1) owned by and stored entirely on controller 12. Tracks 10-19 make up a fragment (Fragment 2) owned by storage controller 12 and stored synchronously on controllers 12 and 13. Tracks 20-29 make up a fragment (Fragment 3) owned by storage controller 12 and stored synchronously on controllers 12 and 13. Tracks 30-39 make up a fragment (Fragment 4) owned by storage controller 13 and stored synchronously on storage controllers 12 and 13. Tracks 40-49 make up a fragment (Fragment 5) owned by storage controller 13 and stored synchronously on storage controllers 12 and 13. Tracks 50-59 make up a fragment (Fragment 6) owned by and stored entirely on storage controller 13 The following Table 1 sets forth the requests by host 14 and the responses and actions by storage controllers 12 and 13.

TABLE 1

| I/O request from host | | | | |
|---|---|---|---|---|
| Request Number | Type | Track/ Fragment | Controller | Response/actions |
| 1 | Read | 0/1 | 12 | Fragment 1 is stored in controller 12 only. 1. Respond to host. |
| 2 | Read | 10/2 | 12 | Fragment 2 is stored in both controllers (no guaranteed sync). 1. Respond to host. |
| 3 | Read | 20/3 | 12 | Fragment 3 is stored in both controllers (guaranteed sync). 1. Responds to host. |
| 4 | Read | 30/5 | 12 | Fragment 4 is stored in both controllers (no guaranteed sync). 1. Respond to host. |
| 5 | Read | 40/5 | 12 | Fragment 5 stored in both controllers 12 and 13 (guaranteed sync). |

TABLE 1-continued

I/O request from host

| Request Number | Type | Track/Fragment | Controller | Response/actions |
|---|---|---|---|---|
| 6 | Read | 50/6 | 12 | 1. Send lock request to controller 13.<br>2. Controller 13 confirms lock.<br>3. Controller 12 responds to host.<br>4. Controller 12 sends release request to controller 13.<br>Fragment 6 is not stored in controller.<br>1. Forward request to controller 13.<br>2. Controller 13 responds to controller 12.<br>3. Controller 12 responds to host. |
| 7 | Read | 0/1 | 13 | Fragment 1 not stored in controller.<br>1. Forward request to controller 12.<br>2. Controller 12 responds to controller 13.<br>3. Controller 13 responds to host. |
| 8 | Read | 10/2 | 13 | Fragment 2 stored in both controllers (no guaranteed sync).<br>1. Respond to host. |
| 9 | Read | 20/3 | 13 | Fragment 3 stored in both controllers (guaranteed sync).<br>1. Send lock request to controller 12.<br>2. Controller 12 confirms lock.<br>3. Controller 13 responds to host.<br>4. Controller 13 sends release request to controller 12. |
| 10 | Read | 30/4 | 13 | Fragment 4 is stored in both controllers (no guaranteed sync).<br>1. Respond to host. |
| 11 | Read | 40/5 | 13 | Fragment 5 is stored in both controllers (no guaranteed sync).<br>1. Respond to host. |
| 12 | Read | 50/6 | 12 | Fragment 5 is stored in controller 13 only.<br>1. Respond to host. |
| 13 | Write | 0/1 | 12 | Fragment 1 is stored in controller 12 only.<br>1. Store write data<br>2. Confirm to host |
| 14 | Write | 10/2 | 12 | Fragment 2 is stored in both controllers (MM), controller 12 is owner.<br>1. Forward write request to controller 13.<br>2. Controller 13 stores write data.<br>3. Controller 13 confirms to controller 12.<br>4. Controller 12 store write data.<br>5. Controller 12 confirms to host. |
| 15 | Write | 20/3 | 12 | Fragment 3 is stored in both controllers (MM), controller 12 is owner.<br>1. Forward write request to controller 13<br>2. Controller 13 stores write data<br>3. Controller 13 confirms to controller 12<br>4. Controller 12 store write data<br>5. Controller 12 confirms to host |
| 16 | Write | 30/4 | 12 | Fragment 4 is stored in both controllers, controller 13 is owner.<br>1. Cache write request in controller 12<br>2. Forward write request to controller 13<br>3. Controller 13 stores write data<br>4. Controller 13 confirms to controller 12<br>5. Controller 12 commits write data<br>6. Controller 12 confirms to host |
| 17 | Write | 40/5 | 12 | Fragment 5 is stored in both controllers (MM), controller 13 is owner.<br>1. Cache write request in controller 12<br>2. Forward write request to controller 13<br>3. Controller 13 stores write data<br>4. Controller 13 confirms to controller 12<br>5. Controller 12 commits write data<br>6. Controller 12 confirms to host |
| 18 | Write | 50/6 | 12 | Fragment 6 is stored in controller 13 only (not in-sync).<br>1. Forward write request to controller 13<br>2. Controller 13 stores write data<br>3. Controller 13 confirms to controller 12<br>4. Controller 12 confirms to host |
| 19 | Write | 0/1 | 13 | Fragment 1 is stored in controller 12 only (not in-sync).<br>1. Forward write request to controller 12<br>2. Controller 12 stores write data<br>3. Controller 12 confirms to controller 13<br>4. Controller 13 confirms to host |
| 20 | Write | 10/2 | 13 | Fragment 2 is stored in both controllers, controller 12 is the owner.<br>1. Cache write request in controller 13<br>2. Forward write request to controller 12<br>3. Controller 12 stores write data<br>4. Controller 12 confirms to controller 13<br>5. Controller 13 commits write data<br>6. Controller 13 confirms to host |
| 21 | Write | 20/3 | 2 | Fragment 3 is stored in both controllers (MM), controller 1 is the owner.<br>1. Cache write request in controller 13<br>2. Forward write request to controller 12<br>3. Controller 12 stores write data<br>4. Controller 12 confirms to controller 13<br>5. Controller 13 commits write data<br>6. Controller 13 confirms to host |
| 22 | Write | 30/4 | 2 | Fragment 4 is stored in both controllers, controller 13 is owner.<br>1. Forward write request to controller 12<br>2. Controller 12 stores write data<br>3. Controller 12 confirms to controller 13<br>4. Controller 13 stores write data<br>5. Controller 13 confirms to host |
| 23 | Write | 40/5 | 2 | Fragment 5 stored in both controllers (MM), controller 13 is the owner.<br>1. Forward write request to controller 12<br>2. Controller 12 stores write data<br>3. Controller 12 confirms to controller 13<br>4. Controller 13 store write data<br>5. Controller 13 confirms to host |
| 24 | Write | 50/6 | 2 | Fragment 6 stored in controller 13 only.<br>1. Store write data<br>2. Confirm to host |

The first I/O request by host 14 is a Read operation to controller 12 for Track 0 (fragment 1), which is stored in Controller 12. Controller 12 responds with a Read of Track 0 to host 14. The second I/O request by host 14 is a Read operation to controller 12 for Track 10 (fragment 2) which is stored in both controllers and there is no guaranteed synchronization. Controller 12 responds to the host. The third I/O request by host 14 is a Read operation to controller 12 for Track 20 (fragment 3), which is stored in both controllers, owned by Controller 12, and there is guaranteed synchronization. Controller 12 responds to the host.

The fourth I/O request by host 14 is a Read operation to controller 12 for Track 30 (fragment 4), which is stored in both controllers, but there is no guaranteed synchronization. Controller 12 responds to the host. The fifth I/O request by host 14 is a Read operation to controller 12 for Track 40 (fragment 5), which is stored in both controllers, owned by Controller 13, and there is guaranteed synchronization. Controller 12 sends a lock request to controller 13, which owns fragment 4. Controller 13 confirms the lock and controller 12 responds to the host. Controller 12 sends a release request to controller 13.

The sixth I/O request by host 14 is a Read operation to controller 12 for Track 50 (fragment 6), which is not stored in controller 12. Controller 12 forwards the request to controller 13 and controller 13 responds to controller 12. Controller 12 responds to host 14. The seventh I/O request by host 14 is a Read operation to controller 13 for Track 0 (fragment 1) which is not stored in controller 13. Controller 13 forwards the request to controller 12. Controller 12 responds to controller 13 and controller responds to host 14.

The eighth I/O request by host 14 is a Read operation to controller 13 for Track 10 (fragment 2), which is stored in both controllers, but there is no guaranteed synchronization. Controller 13 responds to host 14.

The ninth I/O request by host 14 is a Read operation to controller 13 for Track 20 (fragment 3), which is stored in both controllers, owned by Controller 12, and there is a guaranteed synchronization. Controller 13 sends a lock request to controller 12. Controller 12 confirms the lock. Controller 13 responds to host 14 and controller 13 sends a release request to controller 12.

The tenth I/O request by host 14 is a Read operation to controller 13 for Track 30 (fragment 4), which is stored in both controllers, but there is no guaranteed synchronization. Controller 13 responds to host 14.

The eleventh I/O request by host 14 is a Read operation to controller 13 for Track 40 (fragment 5), which is stored in both controllers, owned by Controller 13, and there is guaranteed synchronization. Controller 13 responds to host 14.

The twelfth I/O request by host 14 is a Read operation to controller 13 for Track 50 (fragment 6), which is stored only in controller 13. Controller 13 responds to host 14.

The thirteenth I/O request by host 14 is a Write operation to controller 12 for Track 0 (fragment 1), which is stored in controller 12, only. Controller 12 stores the write data and confirms to host 14. The fourteenth I/O request by host 14 is a Write operation to controller 12 for Track 10 (fragment 2), which is stored in both controllers, and owned by Controller 12. Controller 12 forwards the write request to controller 13. Controller 13 stores the write data and confirms this to controller 13. Controller 12 stores the write data and confirms this to host 14.

The fifteenth I/O request is a Write operation to controller 12 for Track 20 (fragment 3), which is stored in both controllers and owned by Controller 12. Controller 12 forwards the write request to controller 13. Controller 13 stores the write data and confirms this to controller 12. Controller 12 stores the write data and confirms this to host 14. The sixteenth I/O request is a Write operation to controller 12 for Track 30 (fragment 4), which is stored in both controllers and owned by Controller 13. Controller 12 caches write request in controller 12 and forwards write request to controller 13. Controller 13 requests controller 12 to store write data. Controller 12 stores write data and confirms this to controller 13. Controller 13 stores the write data and confirms with Controller 12. Controller 12 confirms this to host 14.

The seventeenth I/O request is a Write operation to controller 12 for Track 40 (fragment 5), which is stored in both controllers and owned by controller 13. Controller 12 caches write request in controller 12 and forwards write request to controller 13. Controller 13 requests controller 12 to store write data. Controller 12 stores write data and confirms this to controller 13. Controller 13 stores the write data and confirms with Controller 12. Controller 12 confirms this to host 14.

The eighteenth I/O request is a Write operation to controller 12 for Track 50 (fragment 6), which is stored in controller 13, only. Controller 12 forwards write request to controller 13 and controller 13 stores the write data. Controller 13 confirms this to controller 12 and controller 12 confirms this to host 14.

The nineteenth I/O request is a Write operation to controller 13 for Track 0 (fragment 1), which is stored in controller 12, only. Controller 13 forwards the write request to controller 12 and controller 12 stores the write data. Controller 12 confirms this to controller 13 and controller 13 confirms this to host 14.

The twentieth I/O request is a Write operation to controller 13 for Track 10 (fragment 2), which is stored in both controllers, and owned by controller 12. Controller 13 caches write request in controller 13 and forwards write request to controller 12. Controller 12 requests controller 13 to store write data. Controller 13 stores write data and confirms this to controller 12. Controller 12 stores the write data and confirms with Controller 13. Controller 13 confirms this to host 14.

The twenty-first I/O request is a Write operation to controller 13 for Track 20 (fragment 3), which is stored in both controllers and owned by controller 12. Controller 13 caches write request in controller 13 and forwards write request to controller 12. Controller 12 requests controller 13 to store write data. Controller 13 stores write data and confirms this to controller 12. Controller 12 stores the write data and confirms with Controller 13. Controller 13 confirms this to host 14.

The twenty-second I/O request is a Write operation to controller 13 for Track 30 (fragment 4), which is stored in both controllers and owned by controller 13. Controller 13 forwards write request to controller 12. Controller 12 stores the write data and confirms this to controller 13. Controller 13 stores write data and confirms this to host 14.

The twenty-third I/O request is a Write operation to controller 13 for Track 40 (fragment 5), which is stored in both controllers and owned by controller 13. Controller 13 forwards write request to controller 12. Controller 12 stores the write data and confirms this to controller 13. Controller 13 stores write data and confirms this to host 14.

The twenty-fourth I/O request is a Write operation to controller 13 for Track 50 (fragment 6), which is stored in controller 13, only. Controller 13 stores write data and confirms this to host 14.

For read operations, ownership of fragments is important only for the guaranteed synchronous option. The owner is required for the scenarios where the data is changing (i.e. write operations), since one of the controllers (the owner) needs to manage the process and ensure all other controllers are updated as required.

For write operations, ownership of fragments is important for determination of which controller manages the write operation and the order in which write data is committed (committed on owner last).

As Table 1 displays, any read or write activity that is directed to a controller that does not contain the requested data (secondary controller) will be re-directed to the controller that owns the requested data. The owning controller will process the request, respond to the secondary controller and the secondary controller will respond to the host, without the host being aware of the redirection to the owner from the secondary controller. Moreover, the fragment requested by the host can be duplicated to the secondary controller using a method similar to "metro mirror." Metro mirror is a function that offers a synchronous long-distance copy option that constantly updates a secondary copy of a volume to match changes made to a source volume. With metro mirror copying, the source and target volumes can be on the same storage unit or on separate storage units. One can locate the storage unit at another site some distance away. Synchronous mirroring means that each update to the source storage unit must also be updated in the target storage unit before another update can process. When metro mirror receives a host update to the source volume, it completes the corresponding update to the target volume. This guarantees data consistency by ensuring that a write operation that completes is received by the host application after the update has been committed to the target storage unit and acknowledged by both the source and target storage units.

The following summarize the actions set forth in Table 1: (i) read from non-duplicated fragment; (ii) read from non-duplicated fragment not on controller; (iii) read from duplicated fragment; (iv) read from duplicated fragment with guaranteed synchronization; (v) write to non-duplicated fragment; (vi) write to non-duplicated fragment not on controller; (vii) write to duplicated fragment; (viii) write to duplicated fragment with guaranteed synchronization In accordance with an embodiment of the method, any write I/O operation can be mirrored by the owning controller as follows. The host writes to a secondary controller, the secondary controller holds/caches/sets aside the data and sends the write I/O activity to the owning controller. The owning controller sends the write I/O request to any secondary fragments and a commit request to the controller or origin. The owning controller confirms the commitment of the write request to the originating controller. The secondary controller stores the held/cached/set aside data and confirms the I/O request to the host.

In accordance with another embodiment, distributed volumes can have ownership changed as follows. If a fragment is distributed across two controllers, and the owner needs to be switched, the fragment that is not duplicated, must be duplicated. Once the fragment is duplicated it is in-synchronization. All I/O requests are suspended and any active write I/O requests are flushed. The ownership is then switched and the I/O activity is resumed. The process of switching distributed volumes can be used to move data and thereafter duplication can be broken.

The advantages herein include the implementation being carried out at the controller lever and no requirement for extra hardware. An IBM storage area network (SAN) volume controller (SVC) can utilize the embodiments herein to move data between SVC nodes/clusters. Improved disk performance and link utilization in cross-town configurations are realized by the embodiments herein.

Figure 2:
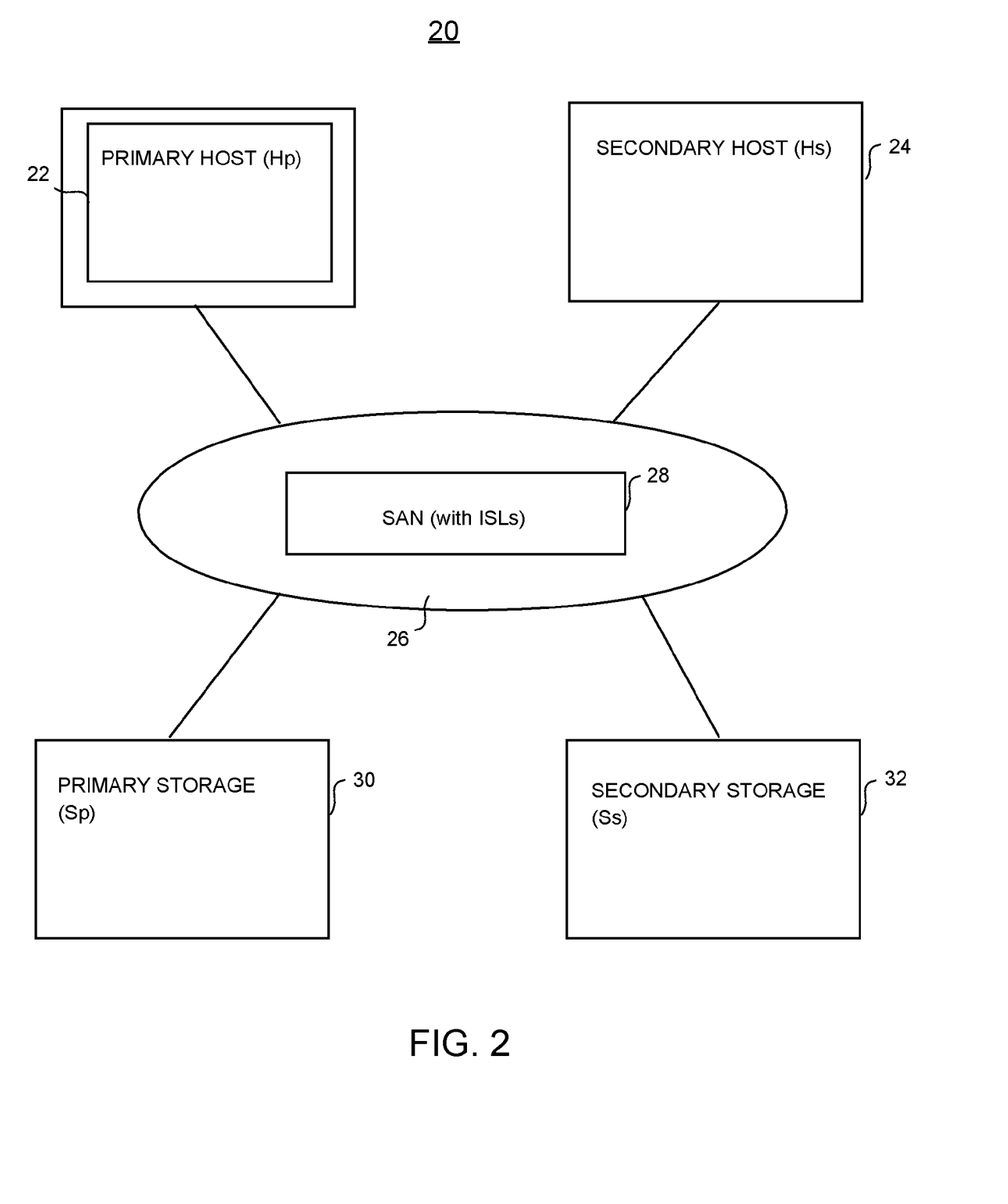
FIG. 2 shows a block diagram of another embodiment of a system for providing storage control in a network of storage controllers.

Reference is made to FIG. 2, which shows a metro mirror configuration 20 using embodiments herein to provide efficiency and speed to the configuration. A primary host 22 and a secondary host 24 are linked to a storage area network (SAN) 26 having an inter-switch link (ISL) 28. A primary storage controller 30 and a secondary storage controller 32 are linked to the storage area network 26. The secondary host 24 is in a different location than the primary host 22 and the secondary storage controller 32 is in a different location than the primary storage controller 30 such as, for example, in the range of 10 to 1000 kilometers away (100 km distance introduces 1 millisecond of latency). The following Table 2 is a comparison of using a metro mirror configuration of the prior art and incorporating embodiments herein using distributed volumes. The following define the abbreviations as follows:
Hp is the primary host
Hs is the secondary host
Sp is the primary storage controller
Ss is the secondary storage controller

TABLE 2

| Action | Prior Art Metro Mirror Configuration | Metro Mirror with Distributed Volumes Configuration | Change | Confirmation Data Sent |
|---|---|---|---|---|
| Primary Host Read | Hp–>Sp–>Hp | Hp–>Sp–>Hp | Unchanged | Hp–>Sp–>Hp |
| Primary Host Write | Hp–>Sp–>Ss–> Sp–>Hp | Hp–>Sp–>Ss–> Sp–>Hp | Unchanged | Hp–>Sp–>Ss–> Sp–>Hp |
| Secondary Host Read | Hs–>Sp–>Hs | Hs–>Ss–>Hs | No ISL required with distributed volumes | Hs–>Ss–>Sp–> Ss–>Hs |
| Secondary Host Write | Hs–>Sp–>Ss–> Sp–>Hs | Hs–>Ss–>Sp–> Ss–>Hs | ISL is only used once with distributed volumes | Hs–>Ss–>Sp–> Ss–>Sp–>Ss–> Hs |

As shown in Table 2, using distributed volumes improves the speed for retrieval of certain read and write I/O requests. In the prior art configuration, there is only one storage controller, primary storage controller 30, taking more time to complete the request. In the new configuration, there is another storage controller, secondary storage controller 32. The secondary host is able to retrieve certain requests directly from the secondary storage controller and in other instances, reduce the amount of times the ISL is used. If a confirmation needs to be sent, the route is set forth in the last column in Table 2. The route is the same for both configurations, but less data is being moved over the ISLs, which reduces the noise in the system. Under certain circumstances, the confirmation may not be required. For example, if the primary host 22 sends a write I/O request to the primary storage controller 30 at the same time that the secondary host 24 sends a read I/O request, the secondary host 24 read I/O request will arrive at the primary storage controller 30 last, wait for the write I/O request to be completed and sent back to primary host 22 and then will submit the read I/O request to primary storage controller 30. If the primary host 22 sends a read I/O request to the primary storage controller 30 at the same time the secondary host 24 sends a write I/O request, the secondary host 24 write I/O request will arrive last, by which time the primary host 22 read I/O request will be in progress or completed.

In another scenario, if the primary host sends a write I/O request to the primary storage controller at the same time that the secondary host sends a read request to the secondary storage controller, the secondary host's read I/O request arrives at the secondary storage controller at the same time the primary host's write I/O request arrives at the primary storage controller. However, the primary host's write I/O request has to traverse the ISLs to the secondary storage controller and it will arrive after the secondary host read I/O request has started. The secondary host will get the data as it was before write caused it to change.

If the primary host sends a read I/O request to the primary storage controller at the same time the secondary host sends a write I/O request to the secondary storage controller, the secondary host write I/O request arrives at the secondary storage controller at the same time that the primary host read I/O request arrives at the primary storage controller. By the time the secondary host's write I/O request has reached the primary storage controller, the primary host's read I/O request will be in progress or be completed. The primary host will get the data before it was changed.

The advantages achieved with the embodiments herein include, but are not limited to, improved read/write times for metro mirror configurations, traversing of ISLs no longer needed with read requests, and single traversing (as opposed to double traversing) of ISLs for write data requests. The load on cross town links is reduced. There is less data moving from primary to secondary controllers. Write data moves from the secondary controller to the primary controller, rather than from secondary to primary to secondary. The number of unit control block (UCBs) required for metro mirror/hyperswap configurations is reduced. Since the volumes are now distributed across multiple controllers, the hosts no longer see the separation between the controllers, so the volumes are able to use the same UCB. This provides up to 33% reduction of UCBs in a metro mirror configuration since there is no longer the concept of primary/secondary/tertiary. The primary/secondary is merged. The hyperswap time is reduced, i.e., in a typical setup, primary and secondary disks have different UCBs, but when a hyperswap is initiated, the UCBs in the secondary hosts I/O table need to be changed, which takes time. Since the UCBs are the same, no change is required.

Additional uses and advantages include the capability to use the embodiments herein with an IBM SAN Volume Controller (SVC) to accelerate the hardware in its ability to move extents. The SVC does not have to read data from the source controller and write data to the target controller, which uses up connection/fabric bandwidth, the cpu and the cache within the SVC. By using a distributed volume it can create a duplicated distributed volume/fragment between the source and target. Once the fragment is in synchronization, the SVC can request a switch of owners and then break the pair. The extent data will not need to contact the SVC during this process, thereby freeing up CPU and cache for servicing the hosts. The embodiments may further be implemented in an SVC for metro mirror configurations and hardware migration purposes to a newer SVC, for example.

Figure 3:
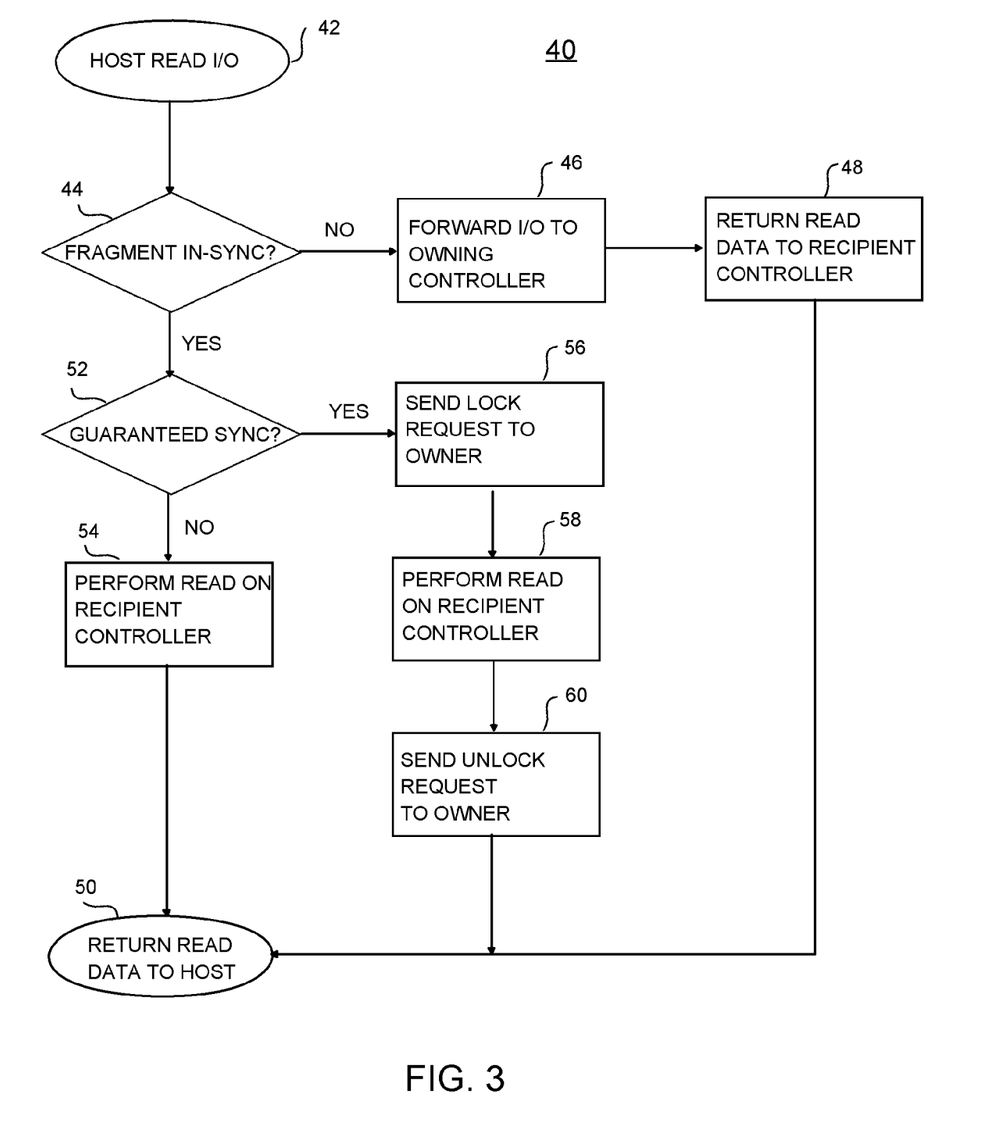
FIG. 3 shows the logic of an embodiment of a method for providing storage control in a network of storage controllers.

Reference is made to FIG. 3, which shows logic 40 of a method embodiment for making a read I/O request. The logic is implemented in a system having one or more hosts and two or more storage controllers containing fragments of data. The method 40 begins at step 42 with the read I/O request by a host to a non-owning storage controller of data. The system queries at step 44 whether the non-owning storage controller of data is in synchronization with the owning storage controller of data. If it is not in synchronization, the request is sent to the owning storage controller at step 46. At step 48, the read data is returned to the recipient controller and at step 50 the read data is returned to the host.

At step 44 if the answer to the query is yes, the system queries whether the synchronization is guaranteed at step 52. If no, the read is performed on the non-owning controller at step 54 and the read data is returned to the host at step 50. If the answer to the query at step 52 is yes, a lock request is sent to the owning storage controller at step 56 and the read is performed on the non-owning controller at step 58. At step 60, an unlock request is sent to the owning storage controller and the read data is returned to the host at step 50.

Figure 4:
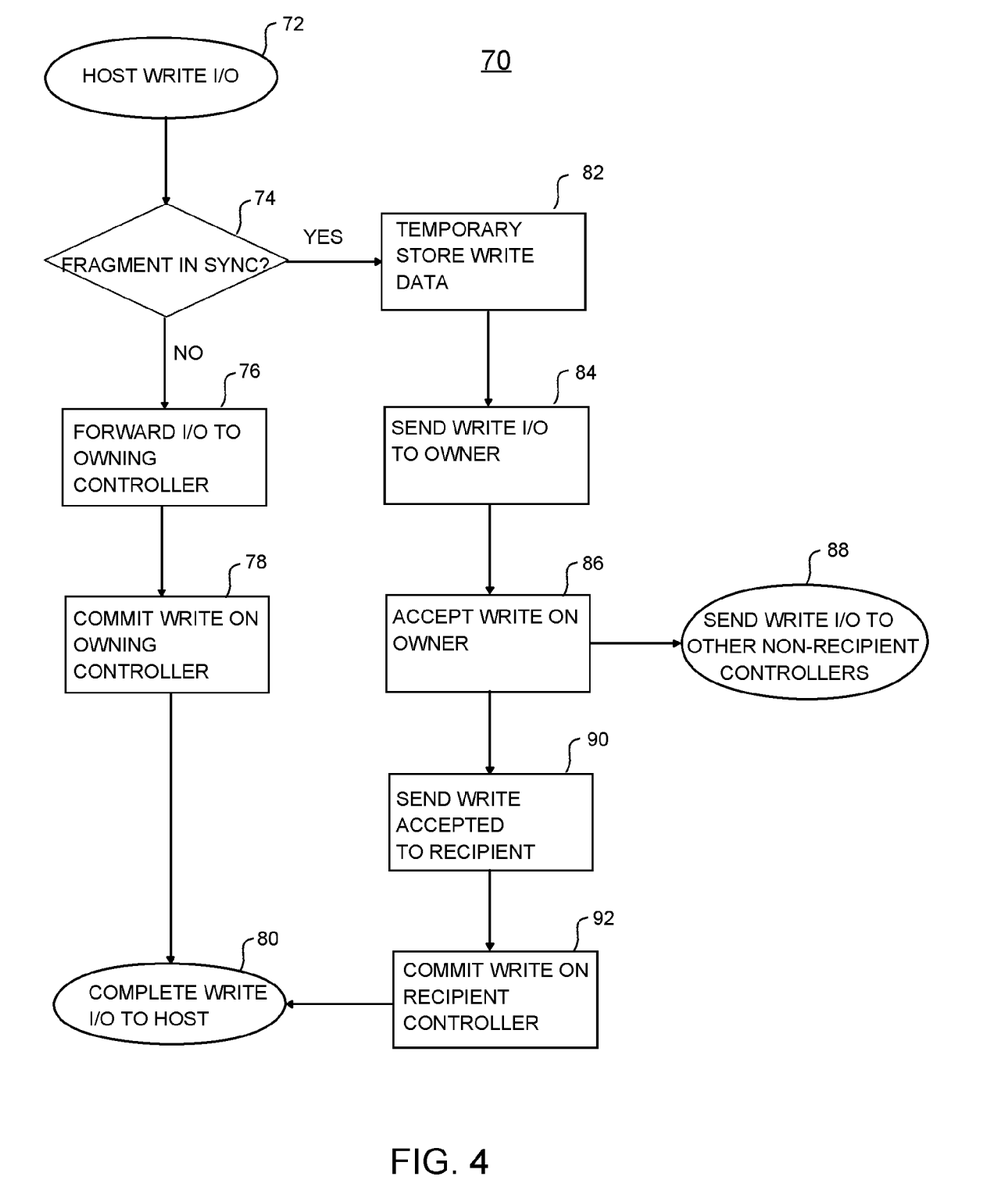
FIG. 4 shows the logic of another embodiment of a method for providing storage control in a network of storage controllers.

Reference is made to FIG. 4, which shows logic 70 of a method embodiment for making a write I/O request. The logic is implemented in a system having one or more hosts and two or more storage controllers containing fragments of data. The method 70 begins at step 72 with the write I/O request made by a host to a non-owning storage controller of data. The system queries at step 74 whether the non-owning storage controller of data is in synchronization with the owning storage controller of data. If it is not in synchronization, the request is sent to the owning storage controller at step 76. At step 78, the write data is committed to the owning storage controller. At step 80, the write I/O is completed and sent to the host.

If the answer to the query at step 74 is yes, the write data is stored temporarily at step 82. At step 84, the write I/O request is sent to the owning storage controller. The write data is accepted by owning storage controller at step 86. At step 88, the write I/O request is sent to other non-owning and non-recipient storage controllers. At step 90, the write data is sent to the non-owning recipient storage controller. At step 92, the write data is committed to the non-owning recipient storage controller and the process ends at step 80 at the host.

In the embodiments herein, a single volume of data can be accessed through multiple storage controllers. The need for primary and secondary hosts to see primary and secondary disks is eliminated. It is possible that the primary host only sees the primary storage controller and the secondary host only sees the secondary storage controller. By having the secondary site host use the secondary site disk the need to read and write data from a remotely attached disk is eliminated. Thus, the read times are reduced as there is no longer cross-town latency; the write times are reduced since data goes cross town only once; the cache/cpu on the secondary storage disk is used more than previously; and the load on the primary storage disk is reduced.

Moreover, the read requests are no longer using cross town links, which eases congestion for mirroring data as these read requests would typically flow in the same direction on the same links The write data from the secondary site only needs to travel over the cross town links once, rather than the two times it had to in previous configurations. The volumes on the primary and secondary disks can use the same UCBs, therefore the need for secondary UCBs is eliminated. Accordingly, there is no need to hold I/O requests while a UCB swap is performed. The host does not need to be linked to all the disks as long as the disk systems are linked to each other.

Embodiments herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, code to send and receive a request for data in a storage controller from a host, code to respond to the host with the request; code to forward the request to another second storage controller if the first storage controller does not contain the requested data, code to respond to the first storage controller from the second storage controller with the request, and code to respond to the host from the first storage controller with the request.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for distributing and accessing data over multiple storage controllers wherein data is broken down into one or more fragments over the multiple storage controllers and wherein each storage controller owns a fragment of the data, comprising:
    receiving a request for data in a first storage controller from one of a plurality of hosts;
    responding to the host by the first storage controller with the request if the first storage controller contains the requested data;
    forwarding the request to the second storage controller from the first storage controller if the first storage controller does not contain the requested data;
    responding to the first storage controller from the second storage controller with the request; and
    responding to the host from the first storage controller with the request.

2. The method of claim 1 wherein the multiple controllers are disposed at varying distances from the one of a plurality of hosts.

3. The method of claim 1 wherein the multiple controllers are disposed equidistant from one of the plurality of hosts.

4. The method of claim 2 wherein the first storage controller is most proximate to the one of a plurality of hosts.

5. The method of claim 1 wherein the second storage controller is the owner of the requested data.

6. The method of claim 1 wherein the request comprises a read or write request.

7. The method of claim 1 wherein the first storage controller is the owner of the requested data.

8. The method of claim 1 wherein the request is a write request,
    wherein the first storage controller sends the write request to the second storage controller, wherein the second storage controller is the owning controller;
    wherein the second storage controller sends a commit request to a third controller, wherein the third controller is the originating controller; and
    wherein the first storage controller confirms the write request to the host.

9. A system for distributing and accessing data over multiple controllers wherein data is broken down into one or more fragments over the multiple controllers comprising:
    a primary host;
    a first storage controller; and
    a second storage controller;
    wherein the primary host makes a request for data to the first storage controller;
    wherein the first storage controller responds to the primary host with the request if the first storage controller contains the requested data;
    wherein the first storage controller forwards the request to the second storage controller if the first storage controller does not contain the requested data;
    wherein the second storage controller responds to the first storage controller with the request; and
    wherein the first storage controller responds to the primary host with the request.

10. The system of claim 9 further comprising:
    a storage area network; and
    a secondary host;
    wherein the secondary host makes a request for data to the second storage controller; and
    wherein the second storage controller responds to the secondary host with the request without needing to switch connections.

11. The system of claim 9 further comprising a plurality of storage controllers, wherein the first, second and plurality of storage controllers are disposed at varying distances from the primary host.

12. The system of claim 9 further comprising a plurality of storage controllers, wherein the first, second and plurality of storage controllers are disposed equidistant from the primary host.

13. The system of claim 9 wherein the first storage controller is most proximate to the primary host and wherein the second storage controller is the owner of the requested data.

14. The system of claim 9 wherein the request comprises a read or write request.

15. A computer program product encoded in a computer readable medium for instructing a system to distribute and access data over multiple storage controllers wherein data is broken down into one or more fragments over the multiple storage controllers and wherein each storage controller owns a fragment of the data, the program code configured to cause the computer to perform the method comprising:
    receiving a request for data in a first storage controller from one of a plurality of hosts;
    responding to the host by the first storage controller with the request if the first storage controller contains the requested data;
    forwarding the request to the second storage controller from the first storage controller if the first storage controller does not contain the requested data;
    responding to the first storage controller from the second storage controller with the request; and
    responding to the host from the first storage controller with the request.

16. The computer program product of claim 15 wherein the multiple storage controllers are disposed at varying distances from the one of a plurality of hosts or are disposed equidistant from one of the plurality of hosts.

17. The computer program product of claim 15 wherein the first storage controller is most proximate to the one of a plurality of hosts and wherein the second storage controller is the owner of the requested data.

18. The computer program product of claim 15 wherein the request comprises a read or write request.

19. The computer program product of claim 15 wherein the first storage controller is the owner of the requested data.

20. The computer program product of claim 15 wherein the request is a write request,
    wherein the first storage controller sends the write request to the second storage controller, wherein the second storage controller is the owning controller;
    wherein the second storage controller sends a commit request to a third controller, wherein the third controller is the originating controller; and
    wherein the first storage controller confirms the write request to the host.

* * * * *